United States Patent
Golinelli

[11] Patent Number: 6,087,919
[45] Date of Patent: Jul. 11, 2000

[54] AXIAL MOVEMENT LINEAR GAUGING HEAD

[75] Inventor: Guido Golinelli, Bologna, Italy

[73] Assignee: Marposs Societa' per Azioni, Bentivoglio, Italy

[21] Appl. No.: 09/155,602

[22] PCT Filed: Jun. 3, 1997

[86] PCT No.: PCT/EP97/02865

§ 371 Date: Oct. 1, 1998

§ 102(e) Date: Oct. 1, 1998

[87] PCT Pub. No.: WO97/46849

PCT Pub. Date: Dec. 11, 1997

[30] Foreign Application Priority Data

Jun. 6, 1996 [IT] Italy ................................ BO96A0301

[51] Int. Cl.[7] .................................................. H01F 21/06
[52] U.S. Cl. ........................... 336/136; 336/130; 336/132
[58] Field of Search ..................... 336/130, 136, 336/132, 131

[56] References Cited

U.S. PATENT DOCUMENTS 3,108,213 10/1963 Golder .
4,347,492 8/1982 Davis et al. .
4,894,897 1/1990 McCloskey .
4,938,069 7/1990 Shoji et al. ............................... 73/728

FOREIGN PATENT DOCUMENTS

| 2207270 | 9/1972 | Germany . |
| 3603 269 | 8/1987 | Germany . |
| 3603269 A1 | 8/1987 | Germany . |
| 1321575 | 6/1973 | United Kingdom . |
| 2107410 | 4/1983 | United Kingdom . |
| WO 83/01301 | 4/1983 | WIPO . |

*Primary Examiner*—Michael L. Gellner
*Assistant Examiner*—Anh Mai
*Attorney, Agent, or Firm*—Dickstein Shapiro Morin & Oshinsky, LLP

[57] ABSTRACT

A linear gauging head, or cartridge head, comprises a casing (1), a spindle (10) movable with respect to the casing along a longitudinal axis, a feeler (12) coupled to a first end of the spindle and a differential position transducer with windings (13, 14, 15), fixed with respect to casing (1), and a core (16) coupled to a second end of spindle (10). The spindle is guided by recirculating ball bushings (18, 19) with rolling elements (29) that cooperate with the spindle and thus allow its displacement with respect to the casing.

10 Claims, 2 Drawing Sheets

{ 6,087,919 }

AXIAL MOVEMENT LINEAR GAUGING HEAD

TECHNICAL FIELD

The invention relates to a linear gauging head comprising support and protection means with a casing defining a longitudinal geometrical axis, an elongate, substantially cylindrical-shaped element, axially movable with respect to the support and protection means, a feeler element coupled to an end of the elongate element, a position transducer, including mutually displaceable parts connected to the casing and to the elongate element, respectively, thrust means located between the support and protection means and the feeler element, and guide means, for guiding axial displacements of the elongate element with respect to the casing, with at least an axial bearing including a plurality of rolling elements cooperating with the elongate element.

BACKGROUND ART

Axial movement linear gauges, or gauging heads, that have similar characteristics are from time conventional in the art. Two embodiments are disclosed in U.S. Pat. No. 4,347,492. A first head, illustrated as prior art in FIG. 1 of the U.S. patent, has the typical structure of the aforementioned, so-called "cartridge" heads, including a cylindrical spindle, axially sliding within a casing by means of a guide device consisting of an antifriction bearing and carrying at one end a feeler for touching the workpiece to be checked and at the other end a ferromagnetic core, that translates inside associated windings, as a consequence of axial displacements of the spindle.

The antifriction bearing comprises balls and a cage with holes for seating the balls, that contact both the external surface of the spindle and the internal surface of the casing. The sliding of the cylindrical spindle is enabled by the rolling of the balls on the two surfaces with which it contacts. Consequently, slidings of the spindle cause slidings of the whole cage.

The structures of the cartridge heads disclose in the U.S. patent are subject to some drawbacks attributable to the great delicacy and care required for the assembly of the guide device.

In fact, for the purposes of a correct performance, the employed antifriction bearings have the need to undergo delicate assembly operations, owing to the fact that, among casing, balls and spindle, there need to be a coupling with a theoretically null clearance, with a very tight tolerance. Furthermore, it is necessary that the various component parts be in well defined reciprocal longitudinal positions, for the sake of preventing inappropriate limitations to the displacing of the cage of the bearing in the course of the slidings between spindle and casing. This means that the component parts have to be manufactured so that one part takes account of the other and assembled with great care, hence implying additional expenses.

The "cartridge" heads with guide devices of this type are subject to further drawbacks, arising from undesired displacements of the cage seating the balls with respect to the previously mentioned accurate longitudinal position. These displacements could be due, for example, to vibrations of the head and the unavoidable clearances that in practice exist. These displacements more frequently occurring in those applications where the measuring head has a vertically arranged measurement axis can improperly limit the possibility of the bearing displacing and alter the possible reciprocal displacements between spindle and casing and, as a consequence, vary the measuring range, till jamming the spindle.

Antifriction bearings including balls are used in a number of devices comprising mutually movable elements, such as he probe for coordinate measuring machines that is shown in international patent application WO-A-8301301. The probe has a stylus carrying a tip and angularly movable in any radial direction. Movements of the tip are mechanically transmitted to an external switch through a ball and cone to the probe housing by means of an antifriction bearing with balls.

British patent application GB-A-2107410 discloses a recirculating ball-spline assembly to be incorporated in industrial machines such as machine tools and industrial robots and including a sleeve, a pair of cage halves, eight sets of balls and a spline shaft having a square cross-section.

DISCLOSURE OF THE INVENTION

Object of the present invention is to provide a cartridge head that has a particularly simple structure and guarantees high standards of accuracy, repeatability, reliability and a reduction of costs and time required for the assembly of the various parts with respect to the known structures.

This is achieved by a gauging head wherein the formerly mentioned axial bearing further includes a hollow support element, fixed with respect to the casing, and a guide structure housed in the hollow support element, the hollow support element and the guide structure defining internal rolling surfaces, said rolling elements being housed inside the support element and adapted to cooperate with the internal rolling surfaces for recirculating in said hollow support element.

BRIEF DESCRIPTION OF THE DRAWINGS

A preferred embodiment of the linear gauging head according to the invention is now described in more detail with reference to the enclosed sheets of drawings, given by way of non limiting example, wherein.

BEST MODE FOR CARRYING OUT THE INVENTION

Figure 1:
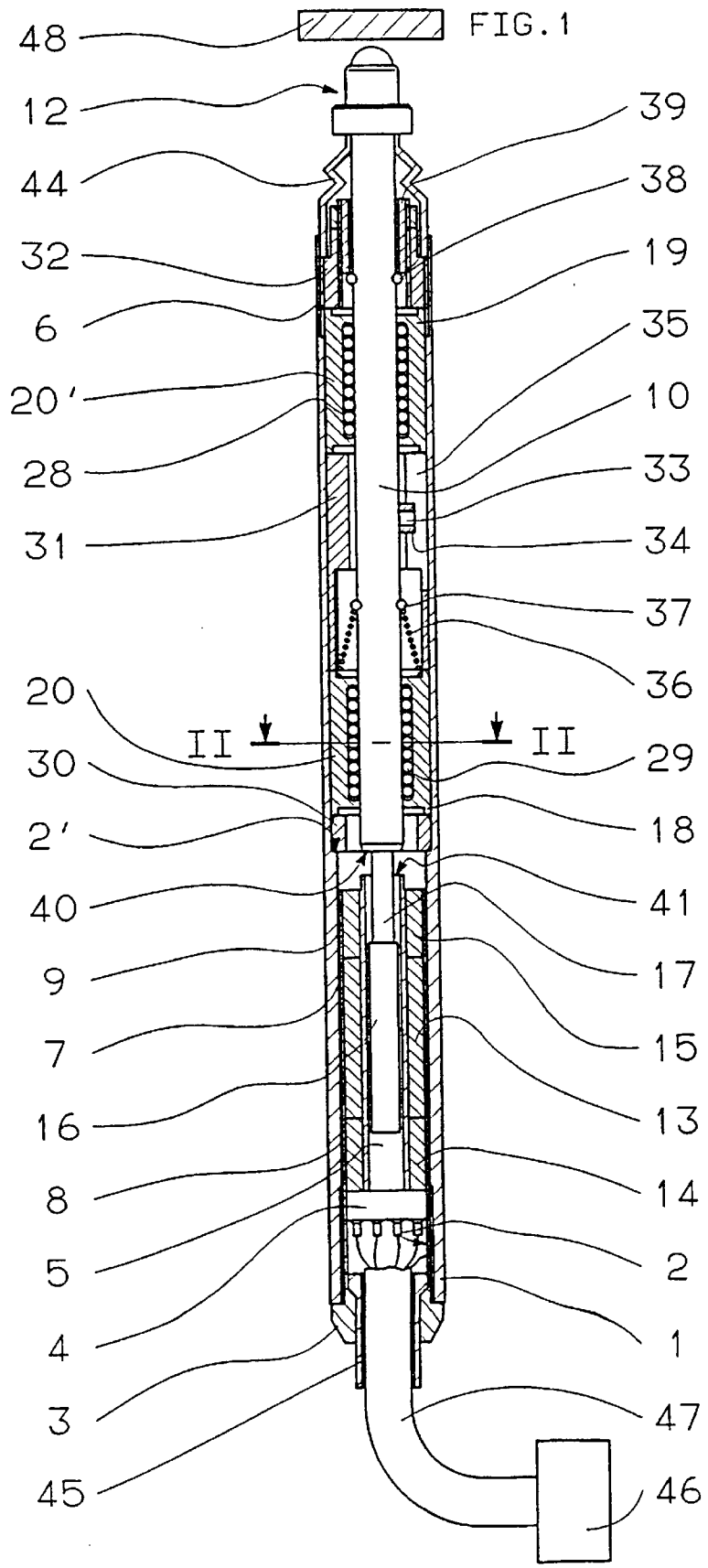
FIG. 1 is a longitudinal cross-sectional view of a gauging head according to an embodiment of the invention.

The axial movement gauging head shown in FIG. 1 comprises support and protection means with a tubular, substantially cylindrical-shaped, steel casing 1 that defines a longitudinal geometrical axis, a substantially cylindrical internal surface 2 with a limiting annular projection 2' and a threaded end portion 6, and a rear closure element 3 coupled (more specifically, glued) to casing 1. A spool 4 is housed in casing 1 and defines a longitudinal opening 5 and three external annular seats 7, 8 and 9.

An elongate element, or spindle, 10 is inserted in and movable with respect to casing 1 and a feeler element with a spherical feeler 12, for contacting a workpiece to be checked 48, is coupled (for example, screwed) to an end of spindle 10 that protrudes from the tubular casing 1.

An inductive differential position transducer comprises a primary winding 13, two secondary windings 14 and 15 and a core 16 made of ferromagnetic material. The windings 13, 14 and 15 are tightly wound—according to a known technique—about spool 4 at the annular seats 7, 8 and 9, respectively, whereas core 16 is fixed (for example, glued) to a stem 17 that is coupled to spindle 10 at the opposite end with respect to the one carrying the feeler element 12. Spool 4 with associated windings 13, 14 and 15 is coupled to tubular casing 1, i.e. the external surface of windings 13, 14 and 15 is glued to the internal surface 2 of tubular casing 1.

Figure 2:
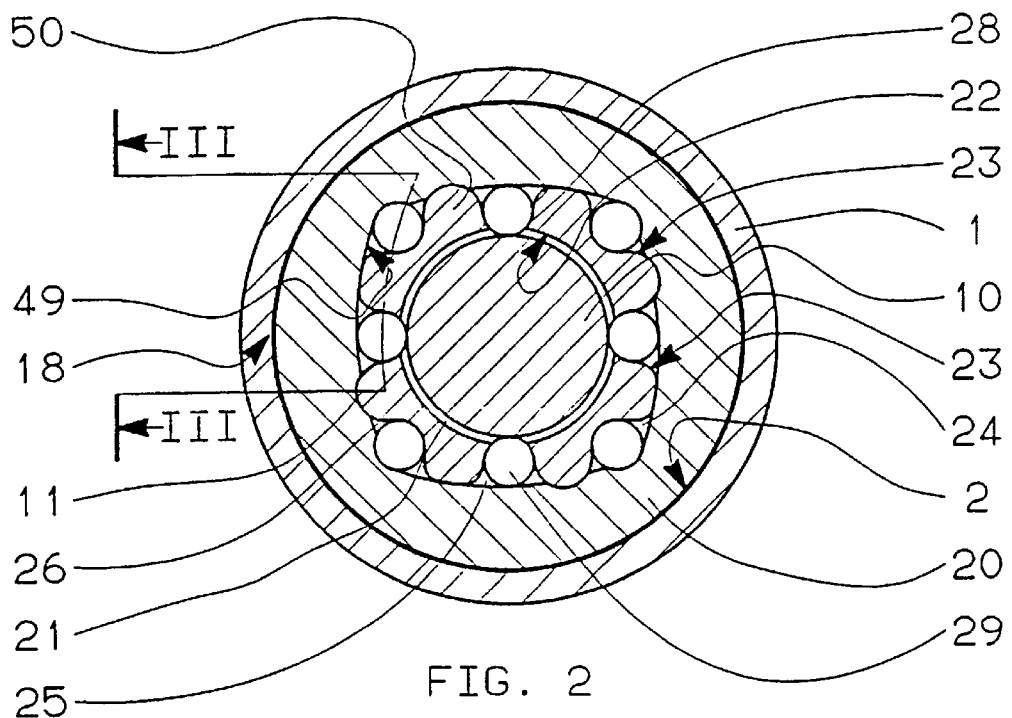
FIG. 2 is an enlarged scale cross-sectional view of the gauging head shown in FIG. 1, taken along line II—II in FIG. 1.
Figure 3:
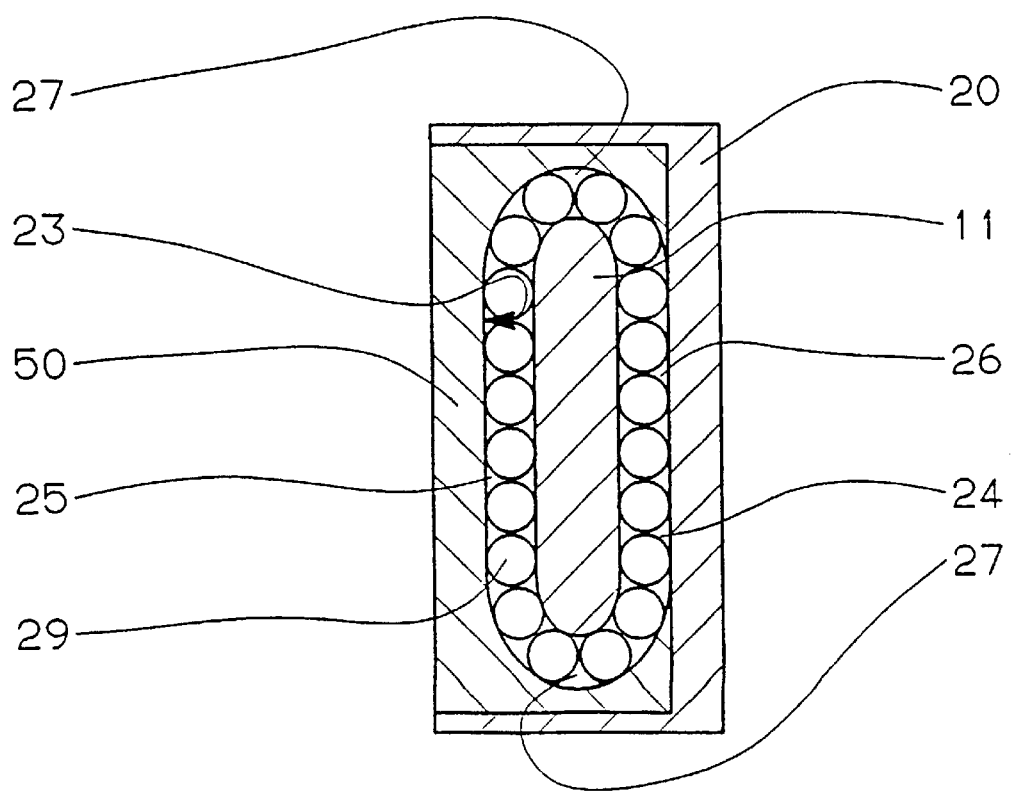
FIG. 3 is a longitudinal cross-sectional view of a detail of the gauging head shown in FIG. 1, taken along line III—III in FIG. 2.

Guide means, for guiding axial displacements of spindle 10 with respect to casing 1, comprise two axial bearings, with recirculating rolling elements, for example recirculating ball bushings, 18 and 19, per se known, housed in casing 1 at longitudinally reciprocally spaced out positions. In the bearings 18 and 19, the rolling elements, in particular balls 29, roll on inside surfaces and contact the external surface of spindle 10, as will be better explained hereinafter. As also shown in FIG. 2, each of the recirculating ball bushings 18 and 19 has a hollow support element 20 (and 20') with a substantially cylindrical shape, that defines an internal surface 49 and houses a guide structure 50 made, for example, of synthetic resin polymers, such as "Teflon" (registered trade mark), and fixed to the hollow support element 20 in contact with the aforesaid surface 49. The guide structure 50 defines a substantially cylindrical longitudinal through hole 21 for the partial insertion of spindle 10. Through hole 21 defines a cylindrical surface 22 of the guide structure 50 that has longitudinal slits 28. The guide structure 50 has moulded portions 11, that, together with portions of the surface 49, define internal rolling surfaces 23 that limit internal circulation tracks 24 where balls 29 are seated. Each track 24 has a first longitudinal portion 25, connected with one of the slits 28, a second longitudinal portion 26, substantially reciprocally parallel, and curved connecting portions 27 between these longitudinal portions 25 and 26. The arrangement of the moulded portions 11 is such that the longitudinal portions 25 and 26 of each track 24 are adjacent to each other and to the cylindrical surface 22. The slits 28, have specific dimensions so as to withhold the balls 29 within the associated rolling track 24 and enable the balls 29 to partially protrude with respect to the cylindrical surface 22 and touch the external surface of spindle 10 when they are in the associated first longitudinal portion 25.

Elements for the longitudinal positioning and clamping comprise a first, tubular-shaped spacer element 30 and a second, tubular-shaped spacer element 31 housed in casing 1 and arranged, respectively, between the annular projection 2' and the support element 20 of bearing 18, and between the support elements 20 and 20' of the two bearings 18 and 19 and a threaded clamping ring nut 32, also tubular-shaped, coupled to the threaded end portion 6 of casing 1 with an end abutting on a base surface of the hollow element 20' of bearing 19.

A pin 33 is radially coupled to spindle 10 and carries at its free end an idle small wheel 34. A slit 35, longitudinally formed in the second spacer element 31, houses—with limited angular clearance—the small wheel 34 that slides therein in the course of the longitudinal displacement of spindle 10 with respect to casing 1, hence limiting the rotation of spindle 10 about its axis. Thrust means comprise an abutment ring 37, coupled to and coaxial with spindle 10, and a compression helical spring 36 arranged between a base surface of the support element 20' of bearing 19 and the abutment ring 37.

An additional abutment ring 38, coupled to spindle 10, is in abutment on a base surface of an adjustment ring nut 39, internally coupled to the clamping ring nut 32 by means of a threaded coupling, for defining and adjusting the longitudinal position of spindle 10, biased by spring 36, when feeler 12 does not contact the workpiece 48.

An abutment surface 41, integral with spool 4, and an abutment surface 40 of spindle 10 cooperate for defining the stroke limit of spindle 10, when feeler 12 contacts workpiece 48, offering resistance to the bias of spring 36. A flexible, tubular-shaped sealing gasket 44 has one of its ends coupled to the area where feeler 12 and spindle 10 are connected, and the other end coupled to the end portion 6 of tubular casing 1.

The rear, closure element 3 has a through hole 45 for the electric connection of the windings 13, 14 and 15 of the differential transducer with external power supply, display and processing devices (schematically shown and identified by reference number 46 in FIG. 1), by means of the wires of a cable 47.

The assembly of the various component parts of the described and illustrated gauging head is performed in a particularly simple and rapid way. More specifically, once spool 4—that carries the windings 13, 14 and 15—has been coupled to casing 1 by gluing the windings as already described, some component parts, namely abutment ring 38, bushing 19, pin 33, ring 37, the second spacer element 31 and spring 36, are coupled to spindle 10. Then, the first spacer element 30, bushing 18 and spindle 10—carrying the formerly mentioned component parts—are inserted in sequence in casing 1 and the whole is locked by ring nut 32. The position of the recirculating ball bushings 18 and 19, in particular the longitudinal positions of the associated support elements 20 and 20' in casing 1 are so defined and fixed by means of the thrust of clamping ring nut 32 and the presence of the spacer elements 30 and 31. When the gauging head is in normal operating conditions and there is no contact occurring between feeler 12 and workpiece 48, as illustrated in FIG. 1, spring 36 urges spindle 10 to reach a rest position defined by the cooperation of the abutment ring 38 with the adjustment ring nut 39. Subsequently, when contact occurs (in any whatever manual or automatic known way, herein neither illustrated nor described) between feeler 12 and a surface of workpiece 48, spindle 10 displaces, with respect to casing 1 and in opposition to the action of spring 36, guided by the recirculating ball bushings 18 and 19, along a rectilinear path parallel to the longitudinal axis of casing 1.

More specifically, balls 29 touch the external surface of spindle 10 through slits 28 and roll at one side on it and at the other on corresponding internal surfaces 23, due to the thrust that spindle 10 undergoes, so circulating along tracks 24.

The displacement of spindle 10 causes core 16 to displace within windings 13, 14 and 15 and a corresponding output voltage variation at the terminals of the secondary windings 14 and 15, according to the known functioning principle of an inductive differential transducer. By means of the electric connection comprising the wires of cable 47, the voltage variation with respect to a zero condition (defined in a known way in a previous zero setting phase of the head), is detected in the external devices 46 and a signal relating to the amount of displacement from the rest position is displayed.

The use of recirculating herein described and 19 in the herein described and illustrated linear gauge provides specific characteristics insofar as simplicity, reliability and economic convenience are concerned. The use of recirculating ball bushings 18 and 19 enables, among other things, to assemble various component parts in an extremely simple way, as previously briefly described. This is due to the fact that, in contrast with what occurs in the known devices employing bearings that have to displace too with respect to the spindle and the casing for enabling reciprocal displacements between spindle and casing, it is not necessary to couple the various parts (casing, spindle, guide with balls) and define their reciprocal position with an extremely high degree of accuracy and a theoretically null clearance. A limited radial clearance between bushings 18, 19 and spindle 10 does not give rise to problems relating to undesired displacements, since the bushings 18 and 19 are held in the correct position by the spacer elements 30, 31 and the clamping ring nut 32. On the other hand, a limited clearance (for example, in the order of one or two $\mu$m) can easily be achieved and does not affect the accuracy and repeatability characteristics of the head. According to other possible variants, there can be foreseen a gauge that differs insofar as the material and/or shape and/or number of components are concerned with respect to what has been herein so far illustrated and described. There can be utilized just one recirculating ball bushing, with a greater longitudinal extension with respect to that of the disclosed bushings 18 and 19, or, on the contrary, there can be provided more than two bushings.

Moreover, the reciprocal arrangement of the bushings 18 and 19 and spool 4 that carries the windings 13, 14 and 15 and the coupling of core 16 to spindle 10 can differ (for example, bushings 18 and 19 can be arranged at the sides of spool 4).

Furthermore, the axial bearings can comprise rolling elements other than balls 29, as, for example, cylindric rollers or rollers of another known shape.

I claim:

1. A linear gauging head comprising:
   support and protection devices with a casing that defines a longitudinal geometrical axis,
   a spindle, axially movable with respect to the support and protection devices,
   a feeler element coupled to an end of the spindle,
   a position transducer including mutually displaceable parts connected to the casing and to the spindle, respectively,
   a thrust device arranged between the support and protection devices and the feeler element, and
   guide means, for guiding axial displacements of the spindle with respect to the casing, with at least an axial bearing including a plurality of rolling elements cooperating with the spindle, wherein the axial bearing further includes a hollow support element, fixed with respect to the casing, and a guide structure housed in the hollow support element, the hollow support element and the guide structure defining internal rolling surfaces, said rolling elements being housed inside the hollow support element and cooperating with the internal rolling surface for recirculating in said hollow support element.

2. A linear gauging head according to claim 1, wherein said guide structure (50), defines moulded portions (11), the hollow support element (20) and the moulded portions (11) defining said internal rolling surfaces (23).

3. A linear gauging head according to claim 2, wherein said rolling elements have a spherical shape, and the guide structure defines a longitudinal through hole for the partial insertion of the spindle, the through hole defining a cylindrical surface that has longitudinal slits for enabling the rolling elements to touch said spindle.

4. A linear gauging head according to claim 3, wherein said internal rolling surfaces define internal circulation tracks for the rolling elements, said tracks comprising a first and a second longitudinal portion and two connecting portions between the longitudinal portions, said slits being located at the first longitudinal portion of each internal circulation track.

5. A linear gauging head according to claim 4, wherein said second longitudinal portion of each circulation track is arranged adjacent to said first portion and the cylindrical surface of the hollow support element.

6. A linear gauging head according to one of claims 1 to 5, wherein the guide means comprise at least a further axial bearing with an additional hollow support element, fixed with respect to the casing, the hollow support elements being arranged in mutually spaced out positions in a longitudinal direction.

7. A linear gauging head according to claim 6, wherein the support and protection means comprise longitudinal positioning and clamping elements (30,31,32) for cooperating with the casing (1) and the hollow support elements (20,20') for defining and fixing said positions of the hollow support elements (20,20') with respect to the casing (1).

8. A linear gauging head according to claim 7, wherein said longitudinal positioning and clamping elements comprise
   at least a tubular-shaped spacer element, housed in the casing and longitudinally arranged between the hollow support elements, and
   a threaded clamping ring nut, the casing defining a threaded end portion for cooperating with said threaded clamping ring nut.

9. A linear gauging head according to one of claims 1 to 5, wherein said mutually displaceable parts of the position transducer comprise electric windings, a spool, fixed with respect to casing for housing said windings and a core made of ferromagnetic material and coupled to the spindle, the spool defining a longitudinal opening, coaxial with respect to the casing, whereinto said core is arranged and is displaceable with respect to the windings.

10. A linear gauging head according to one of claims 1 to 5, wherein said thrust devices comprise an abutment ring coupled to and coaxial with the spindle, and a compression helical spring arranged between said abutment ring and the hollow support element of said axial bearing.

* * * * *

UNITED STATES PATENT AND TRADEMARK OFFICE
CERTIFICATE OF CORRECTION

PATENT NO.   : 6,087,919
DATED        : July 11, 2000
INVENTOR(S)  : Guido Golinelli It is certified that error appears in the above-identified patent and that said Letters Patent is hereby corrected as shown below:

Column 2,
Line 3, before "probe" delete "he", substitute -- the --.
Line 7, after "cone" insert -- coupling and a shaft, the latter translating with respect --.

Column 4,
Line 59, after "recirculating" delete "herein described", substitute -- ball bushings 18 --.

Claims 2,
Line 2, delete "(50)" and "(11)".
Line 3, delete "(20)" and "(11)".
Line 4, delete "(23)".

Claim 7,
Line 2, delete "means", substitute -- devices --.
Line 3, delete "(30, 31, 32)".
Line 4, delete "(1)" and "(20, 20')".
Line 6, delete "(20, 20')" and "(1)".

Signed and Sealed this

Eighteenth Day of September, 2001

Attest:

NICHOLAS P. GODICI
*Attesting Officer*   *Acting Director of the United States Patent and Trademark Office*